UNITED STATES PATENT OFFICE.

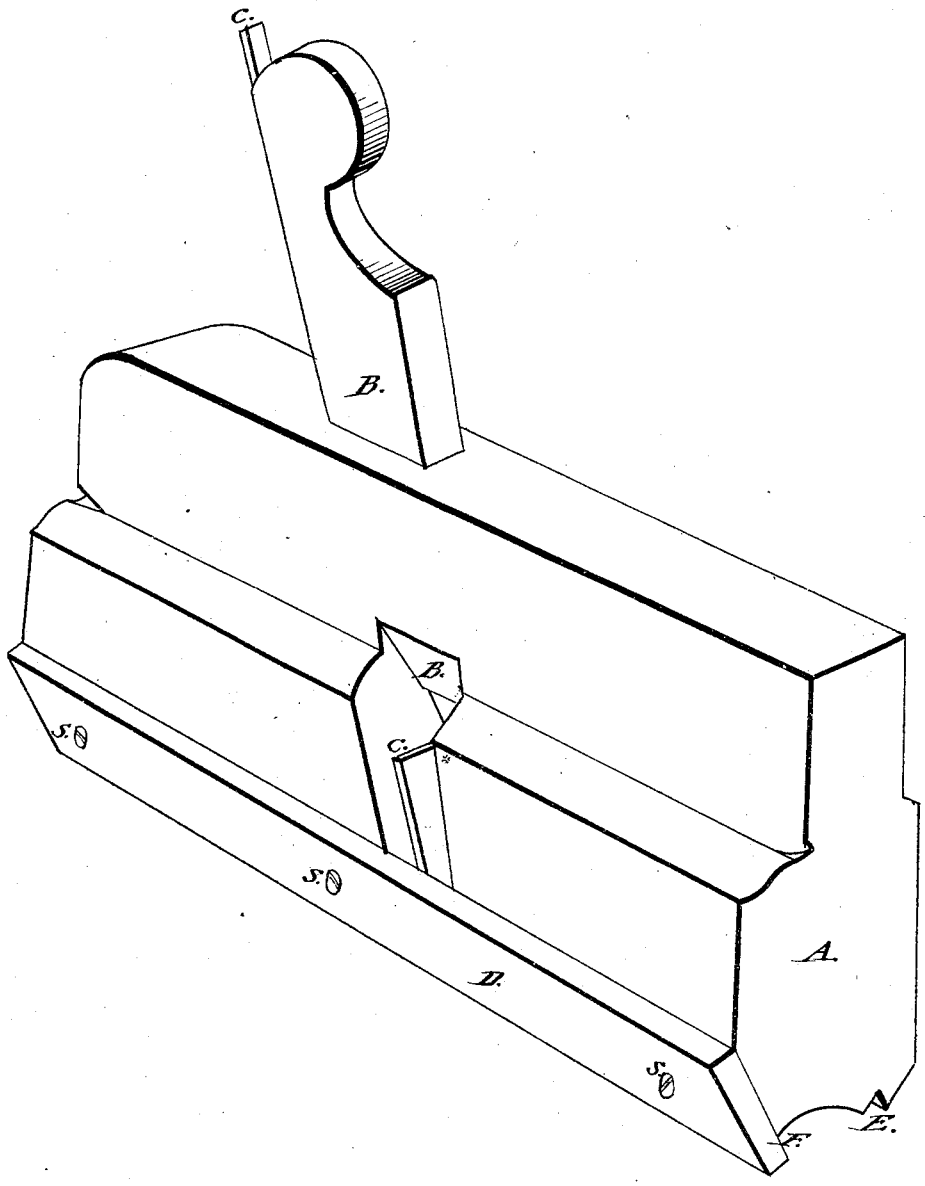

CHARLES FLEMING, OF YPSILANTI, MICHIGAN.

MOLDING-PLANE.

Specification of Letters Patent No. 29,962, dated September 11, 1860.

*To all whom it may concern:*

Be it known that I, CHARLES FLEMING, of the city of Ypsilanti, in Washtenaw county and State of Michigan, have invented a new and useful Improvement on Tools for Making Quarter-Round and Ogee Moldings, the board to be worked standing on edge, which I call "Fleming's self-regulating quarter-round and ogee molding tool;" and I do hereby declare that the following is a full, clear, and exact description of the construction and operation of the same, reference being had to the annexed drawings, making a part of this specification, in which the figure represents a perspective of the quarter-round tool as arranged and prepared for use.

A represents the body of the quarter round tool as commonly made.

B, B, represents the key holding the iron in place.

C, C, represents the iron—and E, the face gage.

Parts so far described represent the common form of this tool.

D, represents a wood or metal gage placed upon the side of the tool as seen in the figure, where it is attached and kept in place by the screws S, S, S.

In the ogee tool the same gage is applied in the same manner and with like effect. This gage can be applied with perfect success to any ordinary ¼ round or ogee tool.

To use the tools, either ¼ round or ogee, attach the gage D, as seen in the drawings. Let the iron C, C, be so ground and set in the tool that it shall cut a fair shaving at the face gage E, and scarcely cut at all at the side F. Set the board on edge in the vise of the workman, and apply the tool in the ordinary way, and when the work is complete, the gage D, will arrest the further working of the tool without thought or care on the part of the workman. While with the ordinary tool, without this self-regulating gage, the tool will continue to cut until the whole board is wasted, and its operation must be carefully watched by the workman, to arrest it at the proper time, and then the work will not be as perfect and uniform as with the gage D, added.

I claim—

The combination of the guide strip (D) with ¼ round and ogee molding planes, for the purposes set forth.

CHARLES FLEMING.

Signed in presence of—
    D. B. GREENE,
    H. CAMP.